UNITED STATES PATENT OFFICE.

OTTO GROTHE, OF JERSEY CITY, NEW JERSEY.

PROCESS AND PRODUCT OF TREATING SULFITE PULP-DIGESTER LIQUOR.

1,087,911. Specification of Letters Patent. Patented Feb. 17, 1914.

No Drawing. Application filed November 9, 1911. Serial No. 659,391.

*To all whom it may concern:*

Be it known that I, OTTO GROTHE, Ph. D., a citizen of the United States, and a resident of Jersey City, county of Hudson, and State of New Jersey, have invented certain new and useful Improvements in Processes and Product of Treating Sulfite Pulp-Digester Liquor, of which the following is a specification.

This invention has reference to a novel process of treating sulfite pulp digester liquor. This liquor, forming the raw material, is the waste product of sulfite paper pulp works. It is at the present time usually run into rivers, and thus becomes a public nuisance and is injurious to fish and cattle. Processes heretofore employed for the utilization of this waste liquor had for their purpose production of various commercial articles such as glutinous substances, tanning extracts, fertilizers, cattle food, dye stuffs, and alcohol. However, but a small percentage of the waste liquor could thus be utilized. The largest portion was thrown away, and therefore, the results were not gratifying.

The purpose of the present invention is to provide a novel process by means of which the entire quantity of waste liquor can be worked up into useful and marketable products. The greatest drawback in attempting to utilize the waste liquor is the comparatively large amount of sulfur contained therein in organic combinations, which sulfur could not be split off and removed. The sulfur containing products always show disadvantages in the application, especially when used in the tanning industry. Furthermore, these products contain an undesirable quantity of vegetable gum and other carbo-hydrates, which can not be profitably separated from the other constituents and which appear to be detrimental if the liquor is to be used for tanning purposes. I have, however, discovered that the removal of the sulfur from the digester liquor may be easily effected by the novel process forming the subject matter of this invention, and at the same time the vegetable gums and carbohydrates may be separated from the tanning material. The process has the further advantage of producing a tanning agent in solid form.

The raw liquid from the works contains some free sulfurous acid which is removed, by adding lime or its equivalent, in the usual way in form of sulfite of calcium. The liquid thereby becomes neutral against litmus and for convenience's sake may be somewhat concentrated. The resulting liquor is analyzed and especially the percentage of sulfur is determined according to the methods employed in organic analyses, because by inorganic methods very little or no sulfur will be found. For every 32 parts by weight of combined sulfur present, there are added 65 parts by weight of potassium cyanid, or an equivalent amount of other cyanid, preferably in the form of a strong aqueous solution. The mixture is transferred into an autoclave and heated for from four to five hours, up to a temperature of 150° C., whereby a pressure of about five atmospheres will result. The reaction appears to begin at about 135° C., but longer heating is necessary to complete same.

After cooling, the reaction mass is transferred into a vessel, then diluted with water and allowed to rest for about twenty-four hours. At the end of this time, the sediments have settled to the bottom and the clear, supernatent liquid above is drawn off into a separate vessel and the solid sediment or precipitate washed by decantation. If preferred, a filter press may be used. The precipitate represents neutral sulfite of calcium and may be used again in the manufacture of paper pulp. The resulting liquor which is now free from sulfite of calcium is acidulated by a mineral acid, for instance hydrochloric or sulfuric acid, whereby a copious, brownish precipitate of an organic cyanogen compound is obtained that may be separated from the liquid by filtration. It is washed a little with water and dried at ordinary temperature. High temperatures have to be avoided because the precipitate would become insoluble in water. The brownish precipitate is comparatively insoluble in the mother liquor which contains gums and carbohydrates or saccharine matter, inorganic salts and traces of the new product. The new product, the brownish precipitate, if dissolved in water forms a useful tanning substance. It precipitates gelatin, glue, pancreatin, etc. and is absolutely absorbed by animal skin.

In place of a cyanid, sulfo-cyanids may be used with equal effect except to note that no sulfite of calcium will precipitate. When the resulting liquid is precipitated by a mineral acid a similar product is obtained which also precipitates glue, gelatin, pancreatin, etc., and is also absorbed by animal skin.

This product has the odor of mustard oil and evidently is not so desirable as a tanning substance as the product first described because it contains sulfur.

The very best tanning product is obtained by using a freshly prepared aqueous solution of calcium cyanamid, $Ca(CN_2)$, in place of the above mentioned cyanids. The calcium cyanamid is used, in freshly prepared aqueous solution, as above described.

The novel air-dry product represents a brownish powder which is soluble in lukewarm water and remains in solution on cooling. The products obtained by all three methods contain nitrogen and may be hydrolized by boiling them, for instance with dilute hydrochloric acid. The products obtained by hydrolysis are semi-crystalline, insoluble in the usual solvents, for instance in alcohol, ether, acetone, amyl alcohol, benzene, benzin, etc., and very slightly soluble in water. They are free from nitrogen and when obtained as described probably represent lactones or anhydrids. These hydrolized substances, however, are at present practically useless, especially for tanning purposes, because they are insoluble in water. It is important, however, in substituting the sulfur bearing or sulfo group by another radical, to prevent a return reaction. In the case of the cyanids and cyanamids, the formation of the insoluble calcium sulfite, $CaSO_3$, is sufficient to prevent this.

In the case of a cyanid, the addition of calcium chlorid and ammonium chlorid besides the cyanids was found to increase the quantity of the product. Further addition of alkaline hydrates is needed as soon as it is shown that the mixture of the reagent generates hydrocyanic acid already at ordinary temperature. In the case of calcium cyanamids an excess of the reagent is less detrimental because it will be decomposed by heat anyhow and calcium carbonate and ammonium carbonate will be formed. In the case of hydroxyl groups being present an addition of oxidizing substances like potassium chlorate is needed. The products thus obtained may be used for producing various organic substances, colors, medicines, and the like.

The tanning solutions prepared from the novel products can not be analyzed as to their tanning value by the conventional oxidation methods with permanganate of potassium, indigocarmine, and hide powder; their tanning value is determined by determining the total solids and the ashes before and after treating them with hide powder. The difference represents the absorption of the substance by the hide powder.

I claim as my invention:—

1. The process of treating sulfite pulp digester liquor consisting essentially in neutralizing the liquor, and removing sulfur bearing groups of the organic compounds of the same by subjecting the liquor containing said compounds to the action of a cyanid compound under heat and pressure.

2. The process of treating sulfite pulp digester liquor consisting essentially in first removing the free sulfurous acid and removing sulfur bearing groups of the organic compounds of the same by subjecting the liquor containing said compounds to the action of a cyanid compound under heat and pressure.

3. The process of treating sulfite pulp digester liquor consisting essentially in removing the free sulfurous acid, concentrating the neutral liquor somewhat, and removing sulfur bearing groups of the organic compounds of the same by subjecting the liquor containing said compounds to the action of a cyanid compound under heat and pressure.

4. The process of treating sulfite pulp digester liquor consisting essentially in removing the free sulfurous acid, concentrating the neutral liquor somewhat, removing sulfur bearing groups of the organic compounds of the same by subjecting the liquor containing said compounds to the action of a cyanid compound under heat and pressure, diluting the reaction mass with water, drawing off the liquid, and forming an organic cyanogen compound by the addition of a mineral acid.

5. The process of treating sulfite pulp digester liquor consisting in removing the free sulfurous acid, concentrating the neutral liquor somewhat, removing sulfur bearing groups of the organic compounds of the same by subjecting the liquor containing said compounds to the action of a cyanamid compound under heat and pressure, diluting the reaction mass with water, precipitating an organic cyanamid compound by mineral acid, separating the precipitate from the liquid by filtration, and drying same at ordinary temperature.

6. As a novel composition of matter, an organic substance derived from sulfite pulp digester liquor, and a cyanid compound acting as a substituent for the sulfur bearing groups of the liquor, and existing in form of an airdry powder which is substantially free from sulfur and mineral constituents and constitutes a tanning substance.

7. As a novel composition of matter, an organic substance derived from sulfite pulp digester liquor, and cyanamid acting as a substituent for the sulfur bearing groups of the liquid and existing in form of an airdry powder which is substantially free from sulfur and mineral constituents and constitutes a tanning substance.

Signed at New York, N. Y., this 8th day of November, 1911.

OTTO GROTHE, Ph. D.

Witnesses:
MARIE A. BRAUN,
MARIE H. LEHR.